United States Patent [19]

Allert

[11] 4,445,254

[45] May 1, 1984

[54] HOSE BAND CLIP

[76] Inventor: Kurt Allert, Panoramaweg 3, D-7238 Oberndorf/Neckar, Fed. Rep. of Germany

[21] Appl. No.: 403,332

[22] Filed: Jul. 30, 1982

[30] Foreign Application Priority Data

Jul. 30, 1981 [DE] Fed. Rep. of Germany ....... 3130007

[51] Int. Cl.³ ...................... F16L 33/08; B65D 63/00
[52] U.S. Cl. ..................................... 24/274 R; 24/279
[58] Field of Search ................ 24/274 R, 274 P, 275, 24/279, 280, 281, 285, 20 LS; 248/74 R, 74 A, 74 B, 74 PB

[56] References Cited

U.S. PATENT DOCUMENTS 4,021,892  5/1977  Piper ................................. 24/274 R

FOREIGN PATENT DOCUMENTS 1445626   6/1966  France ............................ 24/274 R
561382    4/1975  Switzerland ........................ 24/274
1013352  12/1965  United Kingdom ................. 24/279

Primary Examiner—Gene Mancene
Assistant Examiner—James Hakomaki
Attorney, Agent, or Firm—Antonelli, Terry & Wands

[57] ABSTRACT

Hose band clip with a tightening strap and a turnbuckle which is secured to one end of the tightening strap and to which a turnbuckle worm, that cooperates with gearing of the tightening strap in order to adjust the strap, is pivoted. Narrow openings are formed in longitudinal sidewalls of the housing of the turnbuckle which, when the tightening strap is tightened, are deformed by a predetermined large tension force transmitted from the worm to the housing of the turnbuckle to provide an optical indication that the tension force should not be increased any further.

7 Claims, 4 Drawing Figures

HOSE BAND CLIP

BACKGROUND AND SUMMARY OF THE INVENTION

The invention pertains to a hose band clip of the type having a turnbuckle and a tightening strap, the turnbuckle having a tightening worm which cooperates in openings in the strap in order to adjust same by rotation of the worm.

In such hose band clips, rotation of the worm can exert very large forces on the housing of the turnbuckle when the tightening strap is tightened. As a result, a danger of overloading arises which may lead to, for example, bending of the turnbuckle housing, which would jeopardize operating safety.

It is, therefore, a principle object of the invention to use a simple means of construction, which gives rise, if at all possible, to no additional costs, in order to ensure that the user of the hose band clip can, without employing torque-indicating wrenches, determine when the hose band clip is tightened with its planned, maximum permissible tension force.

This object is achieved, in accordance with a preferred embodiment, by using a hose band clip of the type initially noted, and providing narrow openings in longitudinal sidewalls of the housing of the turnbuckle which provide an optical indication that the tension force is not to be further increased. In particular, this optical indication is produced by deformation of the opening due to tension force transmitted by the worm.

The deformation of the narrow openings in the longitudinal sidewalls of the housing, which preferably is plastic deformation, but, if necessary, may also be elastic deformation, indicates when the tension force is sufficiently high and should not be increased any further in order to avoid overloading the turnbuckle or the tightening strap. The tension force which leads to visually detectable deformation of the narrow openings can always be set by selecting the thickness of the longitudinal sidewalls of the housing, the arrangement of the narrow openings and their height and also by the selection of material for the housing longitudinal sidewalls, in such a way that, when the maximum desired tension force which should not be exceeded is reached, the narrow openings are deformed to an extent visible to the naked eye for indicating that the tightening strap should not be stretched any further.

The narrow openings can be made in the longitudinal walls of the housing at no additional cost. If, as in the preferred arrangement, the housing of the turnbuckle is manufactured of sheet metal by punching and bending, these narrow openings can be punched out at the same time. If the housing is manufactured of die cast metal or injection molded plastic, these narrow openings can be formed in the housing at the same time as the manufacturing is done.

In the case of turnbuckles of particularly simple design, the worm can be placed at offsets in the housing longitudinal sidewalls and/or the housing cover, with these offsets being integral parts of the housing longitudinal sidewalls; in this case, it need only be ensured that the worm can transmit to the longitudinal sidewalls pressure forces which are large enough to deform the openings. For example, a neck of the worm which connects the head of the worm to the worm drive can be arranged in a connecting link which connects the two longitudinal sidewalls at their forward ends, and in this case, the openings which serve as an optical indication of the maximum planned tension force can be shaped as narrow, vertical windows, which are arranged near this connecting bridge in such a way that they extend over preferably at least the height of this link.

In a preferred embodiment, it is to be ensured that the turnbuckle features a cover which pivots the worm; this cover is to be mounted on the turnbuckle housing in such a way that it can move longitudinally, and features tabs which project to the sides, and which extend into recesses in the longitudinal sides of the housing, that the rear vertical sides of these recesses form abutments for the two tabs of the cover, and that in the longitudinal sidewalls of the housing are the openings which are slightly behind the rear vertical sides of the recesses. This makes it possible to restrict, within narrower limits, the tension force which leads to deformation of the holes. In this case, it is possible to ensure the longitudinal moveability of the cover on the housing in different ways. For example, at each of its longitudinal sides, the cover can feature one or more tabs which project to the side, and which extend into longitudinal holes in the housing sidewalls to mount the cover in such a way that it can move longitudinally. It is also possible to design the cover as a swivelling cover, so that the turnbuckle forms a quick-acting turnbuckle.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
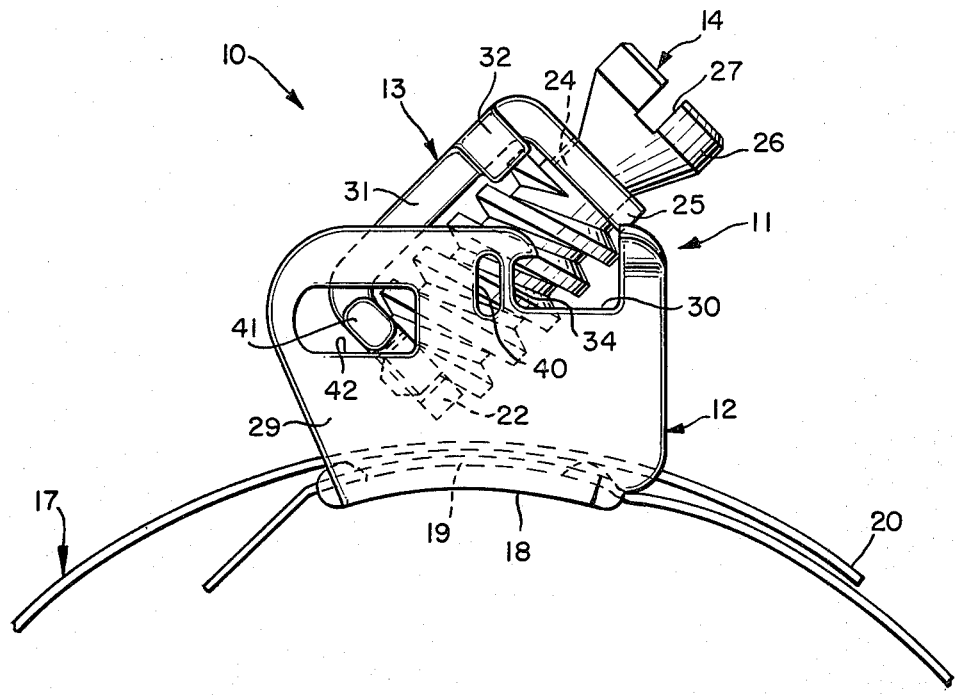
FIG. 1 is a partial side view of a hose band clip in accordance with an embodiment of the invention with a hinged cover opened.

Hose band clip 10, shown in the drawings, features a quick-acting closure in the form of a quick-acting turnbuckle 11, which is comprised of a housing 12 (which is U-shaped when viewed from the front), a hinged cover 13, and a worm 14, which is rotatably held by hinged cover 13. Tightening strap 17, which has an oblique gearing 15 in the form of a row of slanted, circular-segment punch-outs 16, is attached with its one end 19 to housing floor 18 of housing 12 by having tabs 18a, 18b in the front and rear of housing floor 18 extend through punch-outs in the tightening strap, and by having these tabs 18a,b bent onto tightening strap 17 in such a way that this tightening strap end 19 is immovably held to housing floor 18. This tightening strap 17 then runs in a circle back to housing 12, and free end 20 of this tightening strap 17 is run through housing 12 above secured end 19 of the tightening strap. The free end 20 of tightening strap 17 can be manually pulled through housing 12 as desired when hinged cover 13 is raised (FIG. 1). If this tightening strap 17 surrounds a hose or the equivalent to be attached to a nozzle or the like, then, with hinged cover 13 raised, tightening strap 17 can be pulled up manually as far as possible, and then hinged cover 13 folded downward from the open position shown in FIG. 1 into the closed position shown in FIG. 2; this engages the worm screw of worm 14 with gearing 15 of tightening strap 17, so that the tightening strap 17 can no longer be moved by hand, and can only be moved by turning worm 14.

Worm 14 is rotatably held in hinged cover 13 by having hinged cover 13 designed in a U-shaped, when viewed from the side, and by having the point of the worm penetrate a bearing hole 23 of rear side 22 of this hinged cover 13, while the neck 24 of worm 14 (which is smaller than the screw of worm 14 and is smaller in diameter than its head 26) is inserted in a downward-facing bearing slit in front side 25 of hinged cover 13. The two links which form the boundaries of bearing slit 25 are bent toward each other below neck 24 in such a way that neck 24 is pivoted in this longitudinal slit of front side 25 and can no longer displace from it. Head 26 of worm 14 features a slit 27 for a screwdriver. Other head structures, preferably with internal hexagonals, are possible as well.

On the top, near the longitudinal end of the housing which is on the right in FIG. 1, the two longitudinal sidewalls 29 of housing 12 each have an upward-facing recess 30 for tabs 32, which extend laterally outwardly from both longitudinal sides of bridge part 31 of hinged cover 13. When hinged cover 13 is closed, tabs 32 come to rest in the two recesses 30, and, in this case, these two tabs 32 each have an offset directed downwardly outside of the two longitudinal sidewalls 29 of housing 12 in such a way that they extend over these two longitudinal sidewalls 29 when hinged cover 13 is in the closed position in order to ensure that offsets 36 thus form a safety against longitudinal sidewalls 29 separating and/or in order to ensure that (if housing 12 should be damaged by the two longitudinal sidewalls 29 being bent apart) hinged cover 13 will be prevented from closing, so that the user is made aware of the damage to housing 12 which impairs its usability.

At its rear side 22, hinged cover 13 features two projections 41 which extend laterally outwardly therefrom, and which form bearing journals that extend into elongated holes 42 of the two longitudinal sidewalls 29 in order to allow hinged cover 13 to swivel and to move longitudinally. These two elongated holes 42 extend in the longitudinal direction of housing 12, i.e., in the direction in which tightening strap 17 moves.

At their ends, which are adjacent to the hinge of hinged cover 13, each of the two recesses 30 features a rectangular undercut 34 for the two tabs 32; the two tabs 32 can extend into these undercuts to lock hinged cover 13, i.e., to secure hinged cover 13 against opening accidentally. When hinged cover 13 is closed, its two tabs 32 extend into recesses 30, and then force is exerted in the direction of arrow A so that these tabs 32 extend into undercuts 34 of recesses 30, and this locks hinged cover 13 against opening, i.e., against swinging up. In order to unlock it, longitudinal force must be exerted by hand opposite the direction A indicated by the arrow, and then, if the two tabs 32 are removed from undercuts 34, the cover can again be opened.

Figure 2:
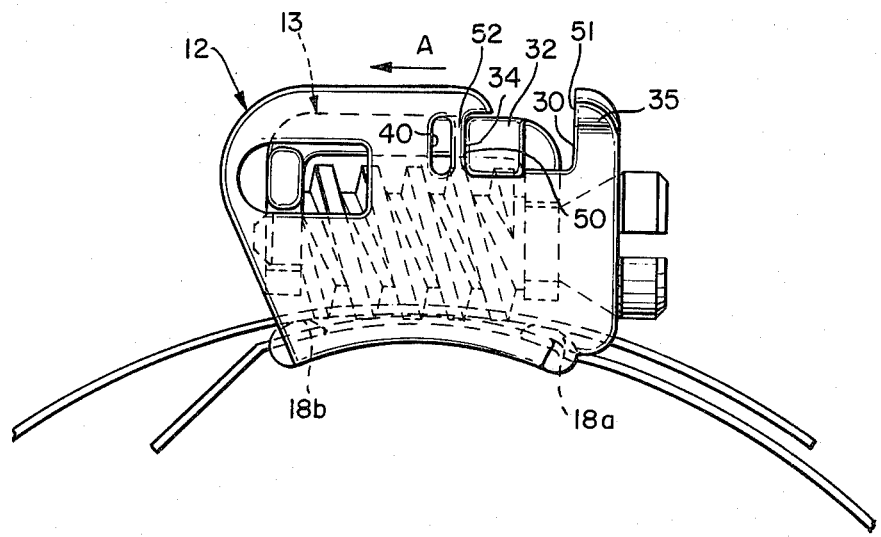
FIG. 2 is a side view of the hose band clip in accordance with FIG. 1, but with the hinged cover closed and locked.
Figure 3:
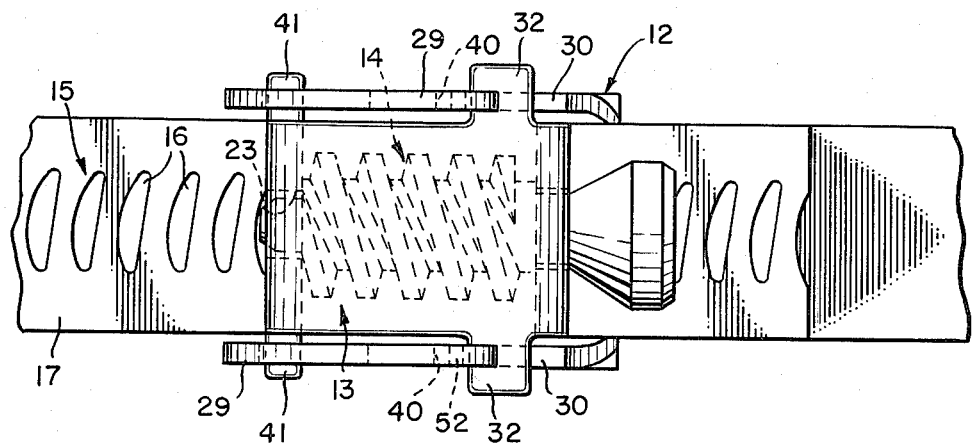
FIG. 3 is a top view of the hose band clip shown in FIG. 2, where the tightening strap is also only partially shown.

If this hose band clip 10 is tightened by turning worm 14 on the hose running through it, then the area of tightening strap 17, which meshes with the worm screw, exerts a force in the direction of arrow A which, accordingly, tends to move hinged cover 13 in the direction of arrow A, and, in this way, the two tabs are pressed onto the rear vertical sides 50 of undercuts 34 of recesses 30, which are vertical relative to FIG. 2, with a force which increases with the tension force. The vertical sides 50, thus, form abutments for the two tabs 32 of hinged cover 13. In this stretched state, as well, accidental openings of hinged cover 13 is reliably prevented by the two undercuts 34.

Figure 4:
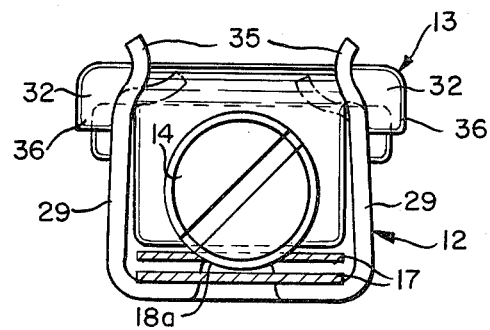
FIG. 4 is a front view of the quick-acting turnbuckle of the hose band clip in accordance with FIGS. 1-3.

In order to provide additional protection against forceful raising of hinged cover 13, the two longitudinal sidewalls 29 are also extended upwards at the forward vertical sides 51 of the two recesses 30 in order to form two claws 35; these claws 35 can be bent, for instance, with a hammer or a pair of pliers, from the basic positions shown in FIG. 4, inward to the positions marked with dotted lines in which they lie opposite front side 25 of hinged cover 13 and prevent hinged cover 13 from being pushed opposite the direction of A into a position in which tabs 32 disengage from undercuts 34 of recesses 30. This makes it possible to additionally lock the operating position of hose band clip 10 to prevent the opening of hinged cover 13 in such a way that it can only be unlocked using tools to bend claws 35 upward. Claws 35 can also, if necessary, be bent around onto hinged cover 13, but it is better if they block the longitudinal movement of hinged cover 13.

According to the invention, in longitudinal sidewalls 29 of the housing, upright narrow longitudinal holes are punched in just behind undercuts 34; these holes form narrow openings 40 in the shape of windows which are separated only by thin linking portions 52 from vertical sides 50 of undercuts 34. Thus, when hose band clip 10 is stretched, portions 52 can be plastically deformed by bending, causing openings 40 to become narrower, under heavy pressure from the two tabs 32 pressed onto vertical sides 50 of undercuts 34; this, in turn, indicates that the planned maximum tension force of the hose band clips has been reached and that the tension force should not be increased any further. For example, longitudinal sidewalls 29 of the housing can be designed in such a way that openings 40 are plastically deformed when a tension force of approximately 500 N is exceeded. Depending on the material and the thickness of longitudinal sidewalls 29 of the housing and the height of vertical sides 50, as well as the distances between openings 40 and undercuts 34, plastic deformation of openings 40 can occur even at smaller tension forces, or only when higher tension forces are reached, so that it is possible, for any hose band clip, to indicate a desired maximum tension force by a plastic deformation of openings 40. This makes it possible to avoid overloads on the hose band clip even without using torque-indicating wrenches. If housing 12 is made of elastically deformable material, openings 40 can be accordingly formed elastically to optically indicate the planned maximum tension force in such a way that the deformation is thus reversible.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Hose band clip with a tightening strap and a turnbuckle, the turnbuckle being secured to one end of the tightening strap and having a turnbuckle worm for cooperating with gearing of the tightening strap in order to exert a tension force for adjusting the tightening strap, said turnbuckle worm being connected to a housing of the turnbuckle, wherein narrow openings are formed in longitudinal sidewalls of the housing of the turnbuckle in such a manner that deformable wall portions are formed which are subjected to a force, corresponding to said tension force, that is transmitted by said turnbuckle worm to the turnbuckle housing during said adjusting of the tightening strap, whereby, when the tightening strap is tightened to a predetermined extent, said narrow openings are deformed by deformation of said deformable wall portions due to said force which is transmitted by the turnbuckle worm to said housing of the turnbuckle to provide an optical indication that the tension force is not to be increased any further in order to prevent overloading of the turnbuckle or the tightening strap.

2. Hose band clip in accordance with claim 1, wherein the turnbuckle has a cover which rotatably carries said worm, said cover being mounted on the turnbuckle housing in such a way that it can be moved longitudinally relative thereto; wherein the cover also has tabs constructed to project laterally outwardly and extend into recesses formed in the longitudinal sidewalls of the turnbuckle housing; wherein rear vertical sides of said recesses form abutments for the tabs of the cover; and wherein said narrow openings are formed in the longitudinal sidewalls of the housing just slightly behind said rear vertical sides of the recesses.

3. Hose band clip in accordance with claim 2, wherein said cover has lateral bearing journals which extend into longitudinally elongated holes formed in the longitudinal sidewalls of the turnbuckle housing so as to enable said longitudinal movement of the cover relative to the turnbuckle housing.

4. Hose band clip in accordance with claim 2 or 3, wherein the cover is a latch type cover that is pivotally connected to the turnbuckle housing.

5. Hose band clip in accordance with claim 4, wherein said narrow openings extend transverse to the longitudinal direction of the housing.

6. Hose band clip in accordance with claim 1 or 2 or 3, wherein said narrow openings extend transverse to the longitudinal direction of the housing.

7. Hose band clip in accordance with claim 2, wherein the longitudinal sidewalls of the turnbuckle housing have deformable claw-like tabs for securing said cover in a closed position, when said worm is engaged with the gearing of the tightening strap and the tabs of the cover are positioned with the recesses of the sidewalls.

* * * * *